United States Patent [19]

Yamada

[11] Patent Number: 5,714,716
[45] Date of Patent: Feb. 3, 1998

[54] BATTERY MOUNTING STRUCTURE FOR POWER SOURCE SECTION OF ELECTRONIC APPARATUS

[75] Inventor: Hiroshi Yamada, Tokyo, Japan

[73] Assignee: NEC Corporation, Tokyo, Japan

[21] Appl. No.: 281,655

[22] Filed: Jul. 28, 1994

[30] Foreign Application Priority Data

Jul. 31, 1993 [JP] Japan ................... 5-208603

[51] Int. Cl.⁶ .................................................. H05K 5/03
[52] U.S. Cl. ................................... 174/52.1; 429/100
[58] Field of Search ........................... 174/52.1, 52.4; 224/902; 429/100, 96; 381/69.2

[56] References Cited

U.S. PATENT DOCUMENTS

| | | | |
|---|---|---|---|
| 2,975,226 | 3/1961 | Lehr | 381/69.2 X |
| 4,126,369 | 11/1978 | Rapata et al. | 174/52.1 X |
| 4,206,274 | 6/1980 | Peels | 429/100 X |
| 4,269,908 | 5/1981 | Stemme | 429/98 |
| 4,391,883 | 7/1983 | Williamson et al. | 429/97 |
| 4,476,353 | 10/1984 | Haertl | 179/107 E |
| 4,680,799 | 7/1987 | Henneberger | 381/69.2 X |
| 4,885,219 | 12/1989 | Miller | 429/99 |
| 4,961,230 | 10/1990 | Rising | 381/64.2 |
| 5,039,580 | 8/1991 | Mori et al. | 429/100 X |
| 5,201,008 | 4/1993 | Arndt et al. | 381/69.2 X |
| 5,206,098 | 4/1993 | Cho et al. | 429/96 |
| 5,413,499 | 5/1995 | Wright, Jr. et al. | 429/98 X |

FOREIGN PATENT DOCUMENTS

| | | |
|---|---|---|
| 85032 | 8/1983 | European Pat. Off. |
| 2475389 | 2/1981 | France. |
| 3717363 | 11/1987 | Germany ................. 174/52.1 X |
| 1266797 | 10/1989 | Japan ..................... 174/52.1 X |

Primary Examiner—Kristine L. Kincaid
Assistant Examiner—Dean A. Reichard
Attorney, Agent, or Firm—Whitham, Curtis, Whitham & McGinn

[57] ABSTRACT

In a miniature electronic apparatus, a battery mounting structure includes a flat battery chamber formed in the casing of the apparatus and having an opening in the upper portion thereof. A lid is rotatable about pins to selectively open or close the opening of the battery chamber. A pair of rails are provided on the inner periphery of the lid in order to support a disk-like battery. To limit the rotatable range of the lid, stops are provided on the lid and respectively received in stop grooves formed in the walls of the battery chamber. Lock pawls extend out from the lid and mate with lock grooves formed in the walls of the battery chamber. When the lid is in an open position, the battery can be loaded in the apparatus. When the lid is in a closed position, it closes the battery chamber. Such a structure facilitates the loading and unloading of the battery while preventing the constituent parts of the apparatus from being lost or damaged by accident.

19 Claims, 6 Drawing Sheets

BATTERY MOUNTING STRUCTURE FOR POWER SOURCE SECTION OF ELECTRONIC APPARATUS

BACKGROUND OF THE INVENTION

The present invention relates to a battery mounting structure for the power source section of an electronic apparatus and, more particularly, to a structure for mounting a miniature disk-like battery to the power source section of a radio pager or similar electronic apparatus.

It is a common practice with a miniature electronic apparatus, e.g., a radio pager or similar radio communication apparatus to use a small size disk-like battery. In a conventional battery mounting structure, a button-like battery, for example, is put in a battery holder which is independent of the casing of the apparatus. The battery holder with the battery is mounted to and dismounted from a power source section via an opening formed in part of the casing adjoining the power source section. In another conventional structure, part of the casing adjoining the power source section is implemented as a closure member rotatable about a hinge. The closure member is openable to directly insert the battery into a battery chamber formed in the power source section. However, the battery holder scheme has a problem that the holder, which is separate from the casing, is often lost when removed from the casing. Moreover, electric contacts provided on the holder are exposed to the outside and, therefore, apt to break. On the other hand, the closure member scheme requires the closure member to open wide enough to accommodate the battery. As a result, excessive loads are apt to act on the hinge and damage it, as well as surrounding portions, when the closure member is opened and closed.

SUMMARY OF THE INVENTION

It is, therefore, an object of the present invention to provide a battery mounting structure for the power source section of an electronic apparatus which facilitates the loading and unloading of a miniature disk-like battery from a battery chamber formed in the power source section.

It is another object of the present invention to provide a battery mounting structure for the power source section of an electronic apparatus which prevents the constituent parts of the apparatus from being lost or damaged by accident.

A battery mounting structure for the power source section of an electronic apparatus of the present invention comprises a casing included in the apparatus and having a flat battery chamber which is capable of receiving a disk-like battery and is formed with an opening in an upper portion thereof, a lid rotatable perpendicularly to a plane containing the opening of the casing to thereby selectively open or close the opening, the lid being capable of holding the battery on the inner periphery thereof, and a restricting device for limiting the movable range of the lid.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1A:
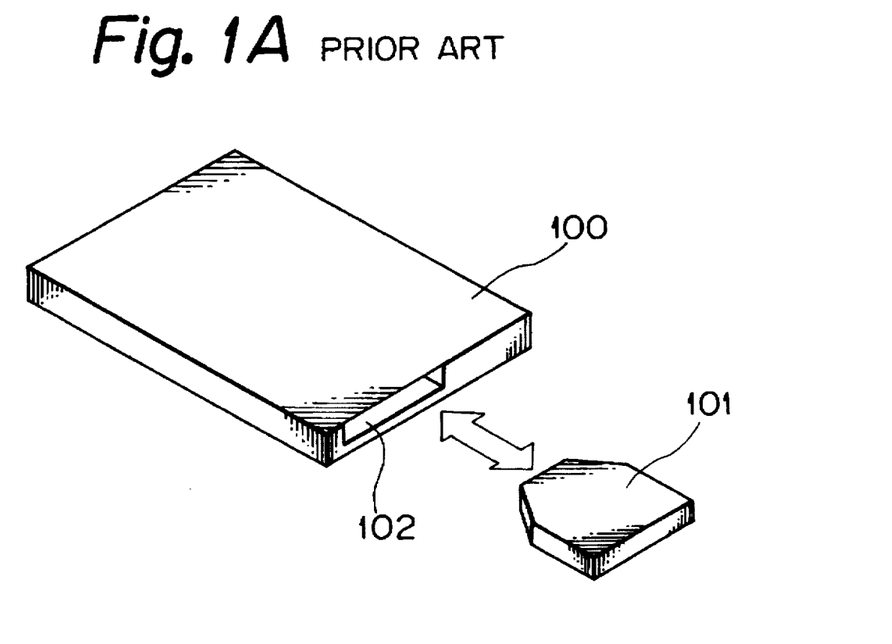
FIGS. 1A and 1B are perspective views each showing a conventional battery mounting structure for the power source section of an electronic apparatus.

To better understand the present invention, a brief reference will be made to a conventional battery mounting structure for a radio pager or similar miniature electronic apparatus, shown in FIG. 1A. As shown, the apparatus has a casing 100 and a battery holder 101 holding a button-like or similar miniature battery, not shown, thereinside. An opening 102 is formed through pan of the casing 100 while a power source section, not shown, is provided in the casing 100. The holder 101, accommodating the battery therein, is selectively inserted into or removed from the casing 100 through the opening 102. This kind of structure has a problem that the holder 101 is often lost when removed from the casing 100. Another problem is that electric contacts provided on the holder 101 are simply exposed to the outside and, therefore, apt to suffer from damage.

Figure 1B:
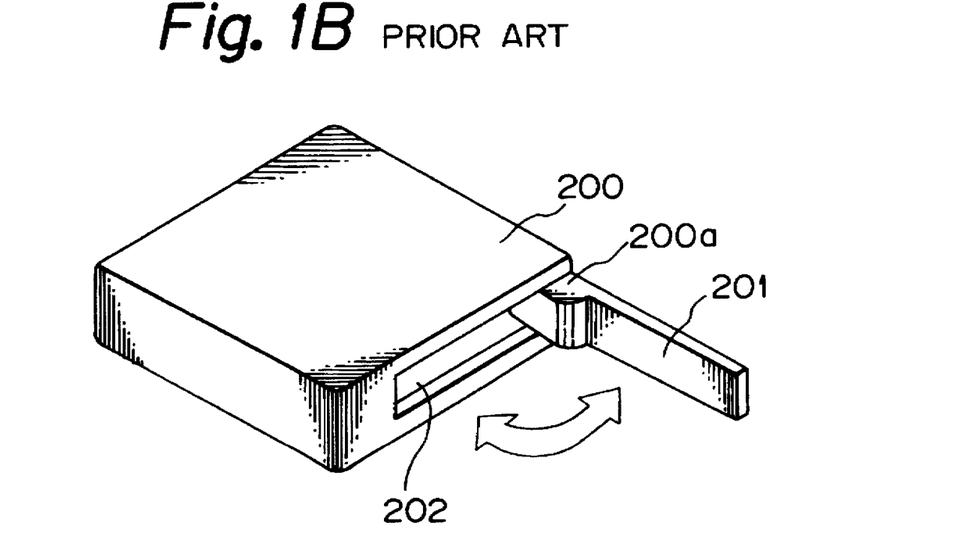

FIG. 1B shows another conventional battery mounting structure. As shown, a closure member 201 forms part of a casing 200 and is rotatable about a hinge 200a. A battery chamber 202 is defined in a power source section provided in the casing 200. A miniature battery is directly inserted into or removed from the battery chamber 202 by opening and closing the closure member 201. However, the prerequisite with such a structure is that the closure member 201 be openable wide enough to facilitate the ingress and egress of the battery from the battery chamber 202. As a result, heavy loads are apt to act on the hinge portion 200a and damage it and surrounding portions.

Figure 2:
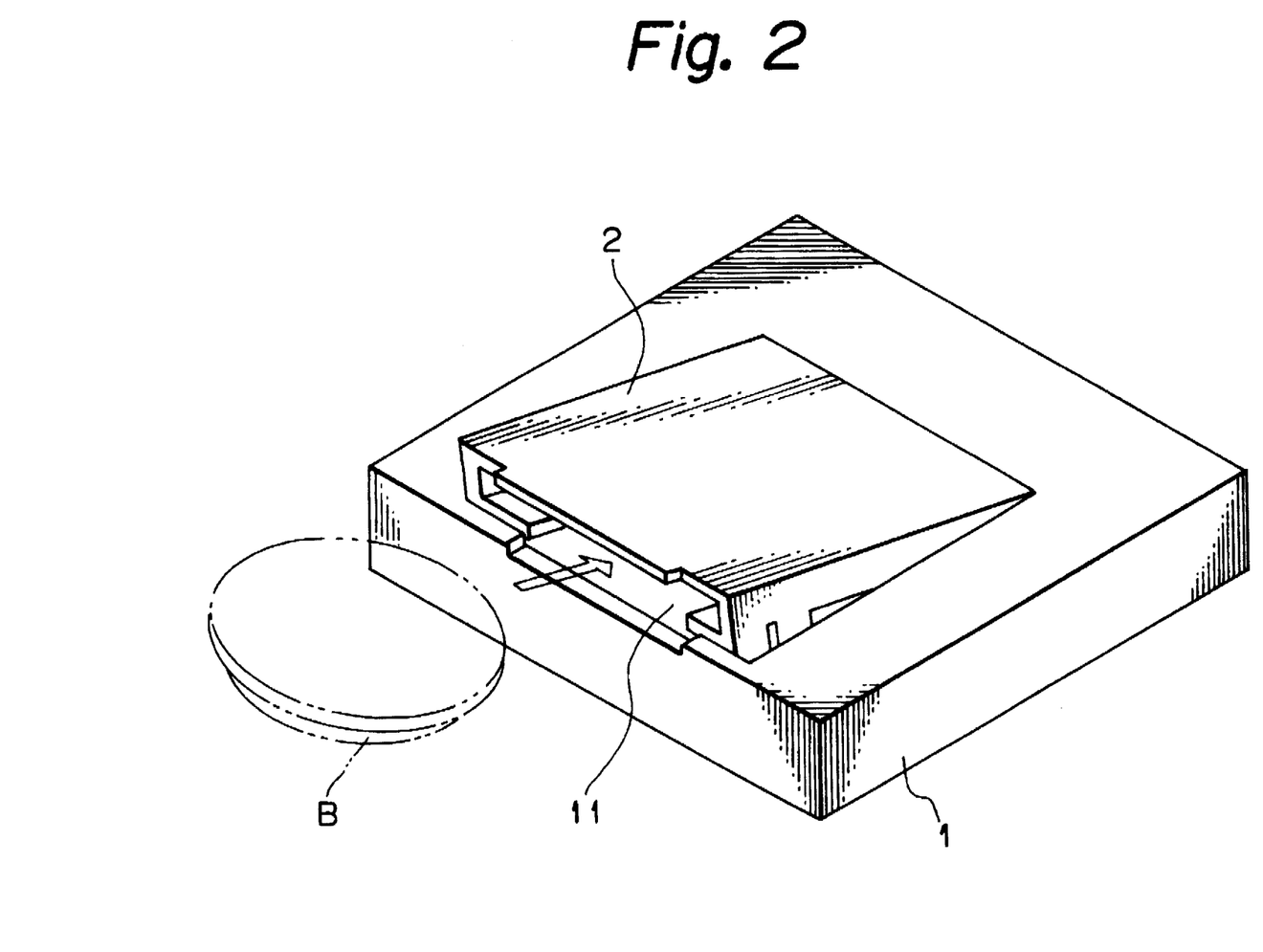
FIG. 2 is a perspective view of a battery mounting structure embodying the present invention.

Referring to FIG. 2, a battery mounting structure embodying the present invention will be described. As shown, an electronic apparatus has a casing 1 in which a rectangular and flat battery chamber 11 is defined. The battery chamber 11 is configured to receive a battery B in a flat position. A lid 2 is movable angularly up and down about one end of the battery chamber 11 so as to open and close an opening contiguous with the upper portion of the chamber 11.

Figure 3:
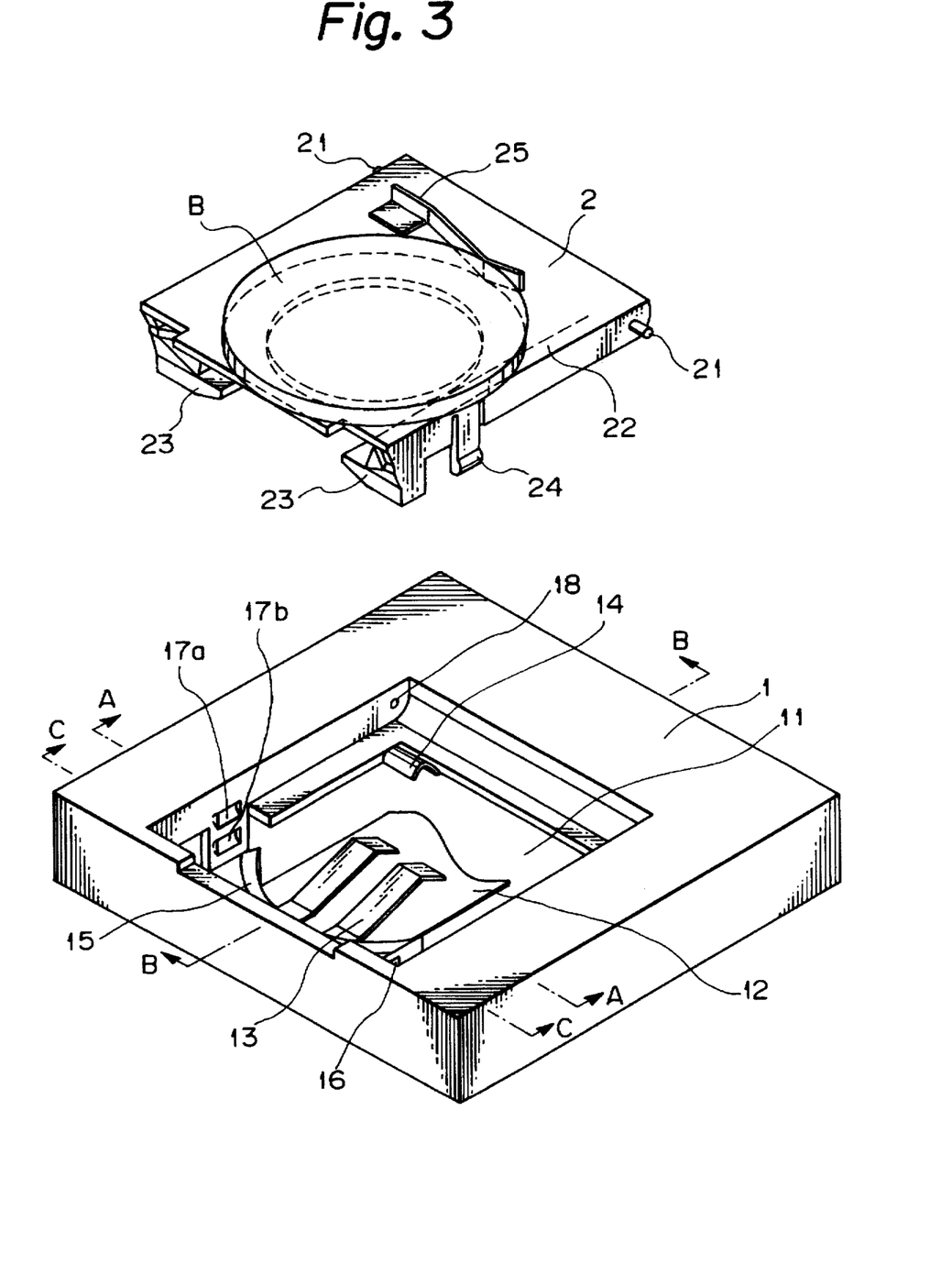
FIG. 3 is a partly exploded perspective view of the embodiment.

As shown in FIG. 3, a circuit board 12, which is built in the apparatus, is partly extended to the bottom of the battery chamber 11. A pair of negative electrode terminals 13 are positioned on the upper surface of the extension of the circuit board 12 and located at substantially the center of the battery chamber 11. The negative electrode terminals 13 are implemented as conductive leaf springs which are resiliently deformable in the up-and-down direction, as viewed in the figure. A conductive leaf spring 14 is located in and at one end of the battery chamber 11 and also elastically deformable in the up-and-down direction. This leaf spring 14 plays the role of a portion connectable to a positive electrode terminal 25 which will be described later.

A battery fixing portion 15 is formed integrally with the casing 1 in and at the end of the battery chamber 11 facing the end where the connecting portion 14 is positioned. The fixing portion 15 has an arcuate tapered configuration for guiding and positioning one side of the battery B. A stop groove 16 is formed in both sides of the fixing portion 15 and extends downward with the top thereof closed. A first and a second lock groove 17a and 17b are formed one above the other in each of opposite inner walls of the battery chamber 11 which adjoin the stop grooves 16.

The lid 2 has pins 21 studded on one end thereof. The pins 21 are respectively received in holes 18 formed in the inner walls of the battery chamber 11 which face each other. In this configuration, the pins 21 allow the other end of the lid 2 to rotate up and down about them. A pair of parallel rails 22, each having a generally L-shaped cross-section, are respectively positioned on opposite inner side peripheries of the lid 2 and extend between the opposite ends of the lid 2. The battery B is inserted into the lid between the rails 22 and supported by them along the inner periphery of the lid 2. Hook-like stops 23 extend inward, i.e., toward each other at the ends of the rails 22 which are remote from the pins 21. The tips of the stops 23 are respectively received in the stop grooves 16 formed in the walls of the battery chamber 11. The portion of each rail 22 close to the associated stop 23 is partly implemented as a tongue, or lock pawl, 24. The lock pawl 24 extends downward from the rail 22 and has a lug at the lower end thereof which is selectively engageable with the lock groove 17a or 17b. The positive electrode terminal 25 mentioned earlier is positioned on the inner periphery of the lid 2 and at the side close to the pins 21. The electrode terminal 25 comprises a conductive leaf spring which resiliently contacts the battery B when the battery B is supported by the lid 2.

Figure 4A:
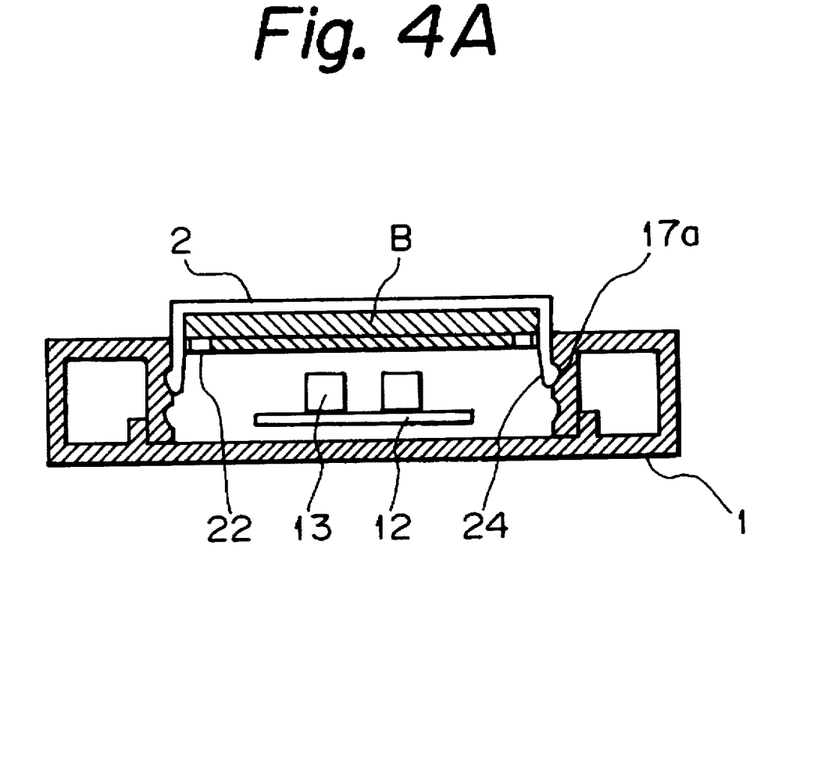
FIGS. 4A and 4B are respectively sections along lines A—A and B—B of FIG. 3, showing a lid in an open position.
Figure 4B:
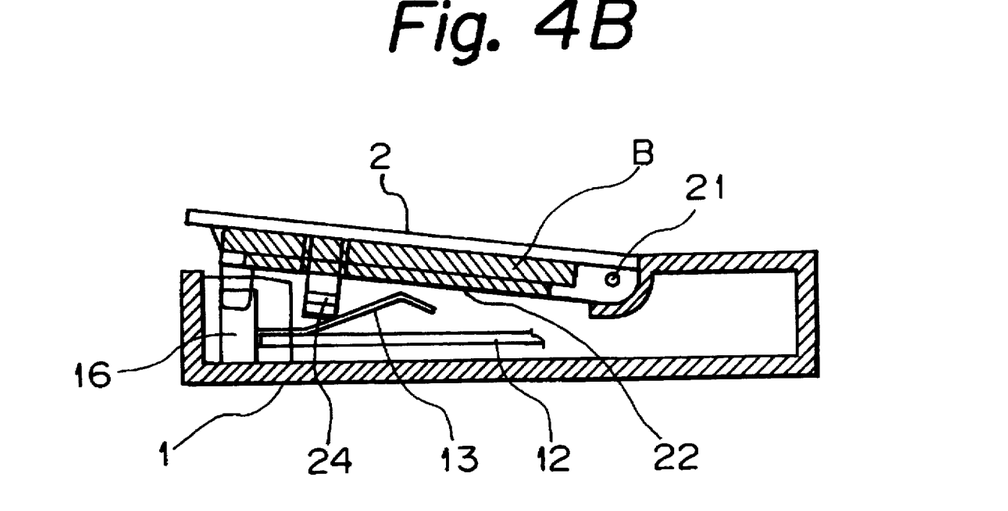

In the structure described above, the end of the lid 2 adjoining the stops 23 is rotatable up and down about the pins 21, thereby opening and closing the battery chamber 11. Since the stops 23 are received in the associated stop grooves 16, the lid 2 is movable only over an angular range corresponding to the movable range of the stops 23 within the stop grooves 16. FIGS. 4A and 4B, which are respectively sections along lines A—A and B—B of FIG. 3, show the lid 2 in the widest open position. As shown, the stops 23 are each held in the highest position within the associated stop groove 16 while the lock pawls 24 of the lid are each received in the associated first lock groove 17a. In this condition, a gap slightly greater than the thickness of the battery B is formed between the lid 2 and the casing 1. When the battery is inserted into the gap between the lid 2 and the casing 1, it is guided deeper into the apparatus by the rails 22 and supported by the rails 22. As a result, the positive electrode, i.e., circumferential edge of the battery B is brought into abutment against and electrical contact with the resilient positive electrode terminal 25.

Figure 5A:
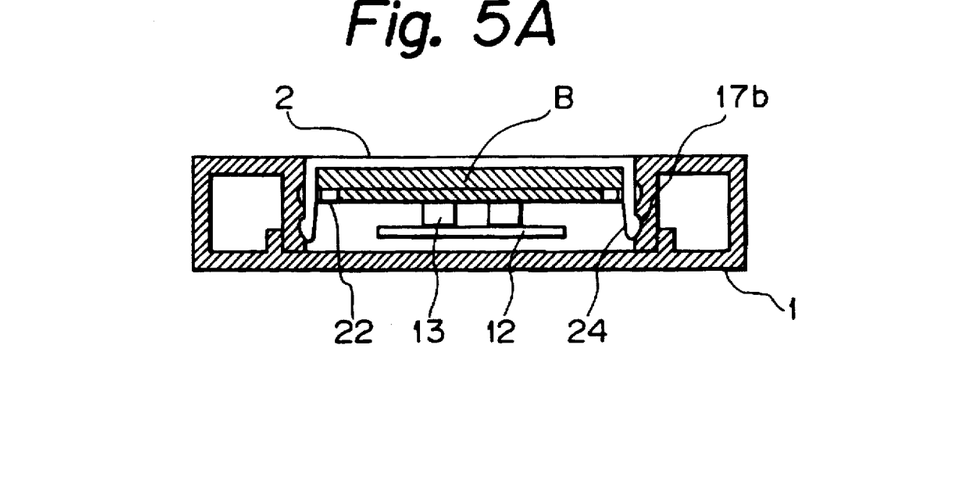
FIGS. 5A, 5B and 5C are respectively sections along lines A—A, B—B and C—C of FIG. 3, showing the lid in a closed position.
Figure 5B:
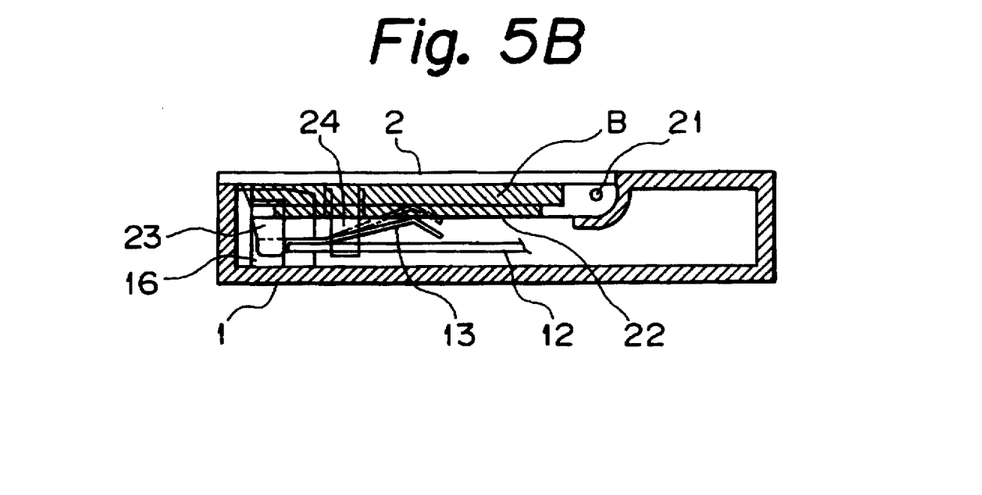
Figure 5C:
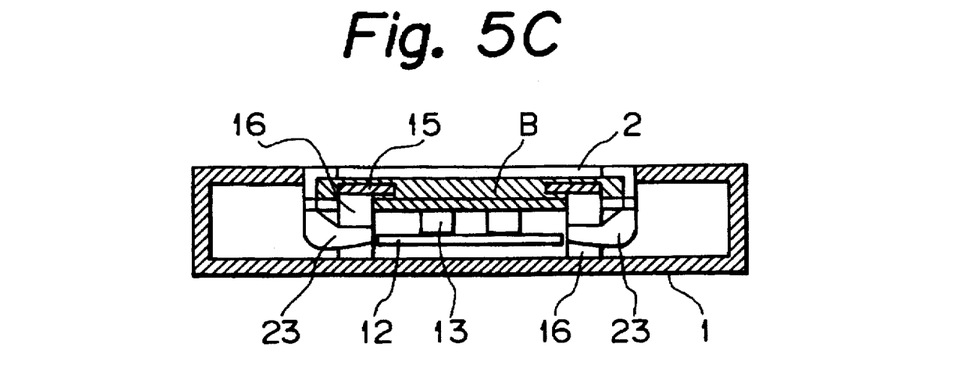
Figure 6:
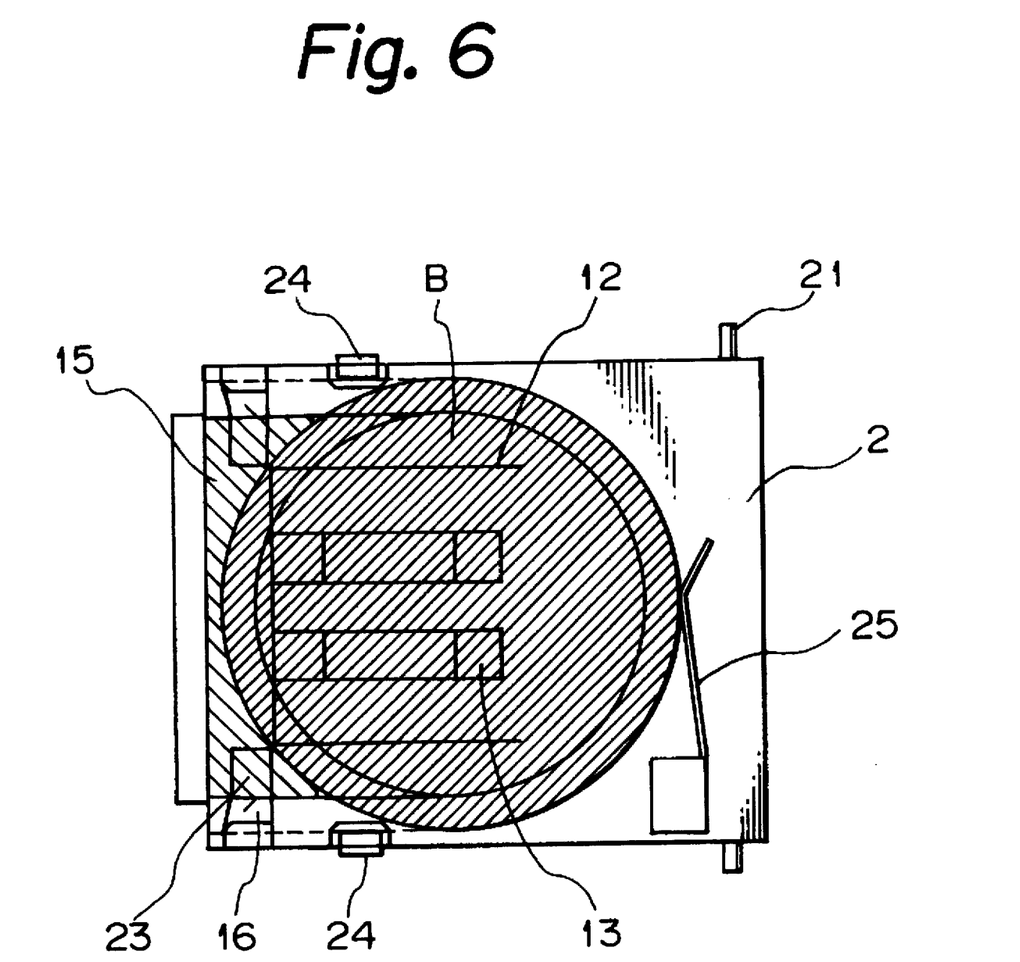
FIG. 6 is a sectional plan view associated with FIGS. 5A–5C.

When the lid 2, supporting the battery as stated above, is closed, there is set up a condition shown in FIGS. 5A, 5B and 5C which are respectively sections long lines A—A, B—B and C—C of FIG. 3. FIG. 6 is a sectional plan view associated with FIGS. 5A–5C. As shown, the stops 23 are lowered within the associated stop grooves 16 while the lock pawls 24 are received in the second lock grooves 17b. As a result, the lid 2 is locked in the closed position. The battery B supported by the rails 22 of the lid 22 is guided by the arcuate and tapered face of the fixing portion 15 to a predetermined position inside of the battery chamber 11. In this condition, the negative electrode, i.e., bottom of the battery B is held in contact with the resilient negative electrode terminals 13 both mechanically and electrically. Also, the positive electrode terminal 25, contacting the positive electrode or circumferential edge of the battery B, is resiliently abutted against and electrically connected to the previously mentioned connecting portion 14. It is to be noted that the positive electrode terminal 25 can be omitted if the connecting portion 14 is so configured as to directly contact the positive electrode of the battery B.

As stated above, in the illustrative embodiment, the lid 2 is movable in the opening and closing direction within the range over which the stops 23 are movable up and down within the stop grooves 16. When the lock pawls 24 mate with the first or upper lock grooves 17a, the lid 2 remains in the open position and allows the battery B to be inserted into or removed from the battery chamber 11 along the inner periphery of the lid 2. When the lock pawls 24 mate with the second or lower lock grooves 17b, the lid 2 remains in the closed position and electrically connects the battery B to the circuitry of the apparatus via the negative and positive electrode terminals 13 and 14.

The embodiment, therefore, eliminates the need for a conventional battery holder which would make it practically impossible to load and unload a battery if lost. The upper opening of the flat battery chamber 11 is opened and closed by the lid 2. This, coupled with the fact that the movable range of the lid 2 is limited by the coactive stops 23 and stop grooves 16, prevents the portion supporting the lid 2 from being damaged by excessive loads.

The positive electrode terminal 25 provided on the lid 2 is not exposed to the outside of the casing 1 and is, therefore, prevented from being broken. This insures the electrical connection of the battery B to the casing 1.

Furthermore, since the lock pawls 24 selectively mate with the first lock grooves 17a or the second lock grooves 17b, the lid 2 is surely held in the open or closed position.

The lid 2 in the closed position will open easily only if the end of the lid 2 adjoining the stops 23 is lifted by, for example, a finger to release the lock pawls 24 from the second or lower lock grooves 17b.

In summary, it will be seen that the present invention relates to a battery mounting structure which facilitates battery loading and unloading operations without requiring a lid to open wide, thereby preventing constituent parts from being lost or damaged. Further, the lid can be surely held in a closed position thereof.

Various modifications will become possible for those skilled in the art after receiving the teachings of the present disclosure without departing from the scope thereof.

What is claimed is:

1. A battery mounting structure for a power source section of an electronic apparatus, comprising:
    a casing operatively connected to said apparatus and having a battery chamber for receiving a battery and an upper portion, said upper portion of said casing including an opening;
    a lid rotatable relative to said opening of said casing for selectively opening or closing said opening, said lid including an inner surface for holding said battery;
    restricting means for limiting a movable range of said lid; and
    locking means for holding said lid in a fully open position of said movable range of said lid.

2. A structure as claimed in claim 1, further comprising second locking means for holding said lid in a closed position within said movable range.

3. A structure as claimed in claim 1, further comprising means for pivotally connecting one end of said lid to said casing.

4. A structure as claimed in claim 1, wherein said inner surface comprises a pair of rails extending along opposite inner sides of said lid, the battery being held between said pair of rails.

5. A battery mounting structure as in claim 1, wherein said locking means comprises pawls connected to said lid and grooves formed in said casing.

6. A battery mounting structure as in claim 5, wherein said pawls each comprise a flexible shaft connected to said lid and a rounded end,
   said grooves having a shape to match said rounded end and being positioned in pairs in said casing to alternately hold said lid in said fully open position and a closed position, and
   each said flexible shaft biasing the corresponding rounded end toward a corresponding pair of said grooves.

7. A battery mounting structure as in claim 1, wherein said movable range of said lid is limited by said restricting means such that when said lid is fully open, an insertion opening having a size approximately equal to a thickness of said battery is formed between said lid and said casing.

8. A battery mounting structure as in claim 1, wherein said restricting means comprises stops connected to said lid and stop grooves formed in said casing.

9. A battery mounting structure as in claim 8, wherein said lid includes a first end pivotally connected to said casing and a second end opposite said first end,
   said casing including a first end adjacent said first end of said lid and a second end opposite said first end of said casing, and
   said stops being connected to said second end of said lid and said stop grooves being formed in said second end of said casing.

10. A battery mounting structure as in claim 8, wherein said lid includes parallel rails for contacting said battery,
    said stops comprising projections from said rails, wherein said projections extend toward each other and toward said battery.

11. A battery mounting structure as in claim 1, wherein said battery includes a first surface, a second surface opposite and parallel to said first surface and sides connecting said first surface and said second surface,
    said lid including:
       a first end for contacting one of said sides of said battery;
       a second end opposite said first end;
       substantially parallel rails running from said first end to said second end for contacting two of said sides of said battery; and
       a first elastic electrical contact positioned at said first end of said lid,
    said rails projecting from said inner surface of said lid and said restricting means including stops projecting toward said battery,
    said rails contacting said second surface of said battery,
    said battery being held in position between said inner surface of said lid and said rails, such that a portion of said second surface of said battery is exposed.

12. A battery mounting structure as in claim 11, wherein said restricting means includes stop grooves formed in said casing for contacting said stops and limiting pivotal rotation of said lid, such that an insertion opening having a size approximately equal to a thickness of said battery is formed between said casing and said second end of said lid for allowing said battery to be inserted into said opening in said casing; and
    said casing includes:
       at least one second elastic electrical contact for contacting said second surface of said battery; and
       a third elastic electrical contact for contacting said first elastic electrical contact when said lid is in a closed position.

13. A storage cell mounting structure, comprising:
    a casing having an opening for receiving a storage cell;
    a lid pivotally connected to said casing for covering said opening and including means for supporting said storage cell; and
    means for holding said lid in a fully open position,
    wherein said storage cell includes a first surface, a second surface opposite and parallel to said first surface and sides connecting said first surface and said second surface,
    said lid including:
       a first surface for contacting said first surface of said storage cell;
       a first end for contacting one of said sides of said storage cell;
       a second end opposite said first end;
       substantially parallel rails running from said first end to said second end for contacting two of said sides of said storage cell; and
       a first elastic electrical contact positioned at said first end of said lid,
    said rails projecting from said first surface of said lid and including stops projecting toward said storage cell,
    said rails contacting said second surface of said storage cell,
    said storage cell being held in position between said first surface of said lid and said rails, such that a portion of said second surface of said storage cell is exposed;
    said casing including:
       stop grooves for contacting said stops and limiting pivotal rotation of said lid, such that an insertion opening having a size approximately equal to a thickness of said storage cell is formed between said casing and said second end of said lid for allowing said storage cell to be inserted into said opening in said casing;
       at least one second elastic electrical contact for contacting said second surface of said storage cell; and
       a third elastic electrical contact for contacting said first elastic electrical contact when said lid is in a closed position.

14. A storage cell mounting structure, comprising:
    a casing having an opening for receiving a storage cell;
    a lid pivotally connected to said casing for covering said opening and including means for supporting said storage cell; and
    means for holding said lid in a fully open position,
    wherein said holding means comprises pawls connected to said lid and grooves formed in said casing.

15. A storage cell mounting structure as in claim 14, wherein said pawls each comprise a flexible shaft connected to said lid and a rounded end,
    said grooves having a shape corresponding to said rounded end and being positioned in pairs in said casing to alternately hold said lid in said fully open position and a closed position, and
    each said flexible shaft biasing the corresponding rounded end toward a corresponding pair of said grooves.

16. A storage cell mounting structure, comprising:
    a casing having an opening for receiving a storage cell;
    a lid pivotally connected to said casing for covering said opening and including means for supporting said storage cell;
    means for holding said lid in a fully open position; and means for limiting rotation such that when said lid is fully open, and an insertion opening having a size approximately equal to a thickness of said storage cell formed between said lid and said casing.

17. A storage cell mounting structure as in claim 16, wherein said limiting means comprises stops connected to said lid and stop grooves formed in said casing.

18. A storage cell mounting structure as in claim 17, wherein said lid includes a first end pivotally connected to said casing and a second end opposite said first end and said casing includes a first end adjacent said first end of said lid and a second end opposite said first end of said casing, said stops being connected to said second end of said lid and said stop grooves being formed in said second end of said casing.

19. A storage cell mounting structure as in claim 18, wherein said means for supporting said storage cell includes substantially parallel rails for contacting said storage cell, said stops comprising projections from said rails, wherein said projections extend toward each other and toward said storage cell.

* * * * *